United States Patent [19]
Fahrer et al.

[11] Patent Number: 6,078,655
[45] Date of Patent: Jun. 20, 2000

[54] AUTOMATIC INTERNATIONAL REATTEMPT METHOD AND APPARATUS

[75] Inventors: Harold Fahrer, Denville; Shubert A. Hau, Wayne; A Helen McGrath, Summit; Christine Patricia Peterson, Fords, all of N.J.

[73] Assignee: AT&T Corp, New York, N.Y.

[21] Appl. No.: 08/919,030

[22] Filed: Aug. 27, 1997

[51] Int. Cl.[7] .................................................. H04M 3/48
[52] U.S. Cl. ......................... 379/209; 379/220; 379/355
[58] Field of Search ..................... 379/209, 219, 379/220, 221, 88.18, 229, 230, 355, 356, 213

[56] References Cited

U.S. PATENT DOCUMENTS

| | | | |
|---|---|---|---|
| 5,311,583 | 5/1994 | Friedes et al. | 379/209 |
| 5,479,500 | 12/1995 | Matsuzaki et al. | 379/209 |
| 5,506,894 | 4/1996 | Billings et al. | |
| 5,539,809 | 7/1996 | Mayer et al. | |
| 5,572,580 | 11/1996 | Ogata et al. | 379/209 |
| 5,799,077 | 8/1998 | Yoshii | 379/209 |

*Primary Examiner*—Scott Wolinsky

[57] ABSTRACT

A method of completing an international call comprises the steps of determining if the international call cannot be completed as dialed for one reason or another and then automatically attempting the call again. There are many reasons for an international call failure including called station busy, domestic or foreign network congestion and invalid dialed number format. The domestic toll network can receive unsuccessful call reason information from either the domestic or foreign network upon the event of an international call failure. It has been shown that if the reasons are, for example, station busy or network congestion, then there is a significant probability that, if the call is immediately reattempted, the call may be completed on the second try. On the other hand, if the reason is an invalid dialed number format, an automatic reattempt of the international called party is inhibited. Also, if the reattempt of a valid number fails and depending on the reason, further international redial services may be offered to the caller.

31 Claims, 2 Drawing Sheets

AUTOMATIC INTERNATIONAL REATTEMPT METHOD AND APPARATUS

BACKGROUND OF THE INVENTION

1. Technical Field

This invention relates to the field of international dialing services and, more particularly, to a method and apparatus for automatically redialing an international call in the event of predetermined call failures or the timeout of a timer.

2. Description of the Related Arts

U.S. patent application Ser. No. 08/919,000, filed Aug. 27, 1997 (Attorney Docket No. Fahrer 7-1-1-1-1-3) describes an international redial system in which the cause of an international call failure is identified according to International Telecommunications Union (I.T.U.) standards. When an international call is placed, modern foreign networks return data representative of one of several reasons for a failure to complete an international call. According to the ITU-T recommendations, cause failure data may represent one of up to 127 individual causes for the failure of an international call, when the call does not go through. For example, cause value code number 17 relates to "user busy, "that is, the called party is presently on their line and the line is busy for that reason. If there is a network busy problem, then a cause value code 42 is returned representing "switching equipment congestion." If the caller dials an invalid number, a cause code value of 28 is returned for "invalid number format."

Different countries have chosen to implement ITU-T recommendations in different ways. For example, the United Kingdom uses the ISUP ( the Integrated Services Digital Network User Part) signaling system to indicate a cause failure reason as a "cause" value number. Other countries such as France use the TUP (Telephone User Part) signaling system in which reasons for call failures are indicated by the generation of an appropriate "signal code." Still other countries use the R2 (Register Signaling 2) signaling system in which "B-signal" codes represent reasons for call failures. All of these may be translated into an indicative signal code. Hereinafter, any one or any other data indicative of a reason for the failure of an international call shall be referred to herein as "unsuccessful call reason information."

It is also described in the '000 application that an international service is presently available from AT&T known as AT&T International Redial (AIR) service. AT&T long distance customers may presubscribe to AIR service. When a subscriber is unsuccessful in completing an international call, AT&T can check to be sure the subscriber has presubscribed and then prompt the subscriber: "If you would like to use AT&T International Redial service, please press *234." If the caller presses *234, the redial service automatically attempts to redial the call, for example, up to ten times in a half hour period. While the caller is waiting for the call to go through, the caller may occupy themselves with other tasks. With AIR service, the caller does not have to place the call until the call goes through, the network does, and calls the caller back when the call is completed.

AT&T previously has relied on the expiration of a timer to determine when to offer *234 international redial service. For example, if a call does not go through before the timer expires, the toll network assumes that there is network congestion. The '000 application describes an international redial service that is based on unsuccessful call reason information as defined above that is returned from the foreign network—such as user busy code 17 or network busy code 42. This saves having to rely on a timer. Also, if cause code value 28, representing an invalid number, is returned, the international redial service can be inhibited.

In the United States and on local calls, traditionally, the calling party, in the event of network congestion, receives a domestic re-order (fast busy signal) or a prompt: "All circuits are busy now; please try your call again later." Of course, a caller hearing such a message is encouraged to place the call themselves at a later time, wasting their time, in hopes that at the later time when they try the call again, the call will go through.

Studies have shown that for national and international calls, in the event of network congestion, there is a real probability that, upon the next immediate attempt, the call will go through. Consequently, prompting the user to try again later may be counterproductive and encourage the caller not to try again. Moreover, the user may forget to make the call later.

Also, once the caller has placed a call the first time, there is an opportunity that revenue to the toll service provider will be lost if the caller does not get through. Moreover, the attempted call has already tied up local exchange carrier and toll facilities in the attempt from which no revenue will result from the call failure.

According to U.S. Pat. No. 5,539,809, there are a number of alternative messages that may be played to a caller during the period of time an international caller is awaiting the called party to answer. These include time-of-day in country announcements and the like that may be country and area code specific. These announcements may compete with announcements made by a toll carrier during a call as described above such as all circuits busy announcements. Consequently, it is also useful that any solution to the problems of failing to complete an international call discussed above that all announcements that may be required are prioritized and coordinated.

Consequently, it is an object of the present invention to increase the likelihood of realizing revenues from a caller's placing an international call. It is a further object to assist the user in making an international call by making an international call as caller friendly and as automatic for the caller as possible.

SUMMARY OF THE INVENTION

According to a method of placing an international call which accomplishes the objects and features sought, a caller places an international call and, upon the toll carrier's receiving unsuccessful call reason data representing, for example, either a network congestion or station busy indication, the caller is advised that the toll carrier would like the calling party to stay on the line and that the carrier will try the call again for them right away. The carrier then tries to reach the called party's line again and, of course, if the call goes through on the second attempt, the caller is happy, and the carrier will receive revenue for the call. The calling customer has not had to redial the number themselves, saving the caller that difficulty.

In an alternative embodiment, the automatic reattempt of an international call need not rely on the return of unsuccessful call reason information for actuation, a time-out, for example, of five to ten seconds may be used to actuate an automatic reattempt in accordance with the present invention. The time duration may vary in this embodiment in accordance with call pattern learning data collected for call processing to a particular foreign calling area. For example, the international call time-out for one foreign country/region based on recent calling patterns may be shorter than for another foreign country/region and periodically updated by the network in country code/city code tables stored in memory.

Also, as suggested by the '000 for international redial service, an automatic reattempt of the called party according to the present invention can be intentionally inhibited in the event unsuccessful call reason information representing an invalid number, for example, an ISUP address incomplete cause value of 28, is returned by the foreign country. There is no purpose in retrying an invalid or incomplete telephone number. A message may then be provided the caller: "Your call cannot be completed as dialed; please contact your operator for assistance."

If the automatic reattempt fails one or more times (the number predetermined by setting system parameters), another service will be offered according to the present invention. For example, after two successive failures, the toll carrier can then proceed to offer additional services or features such as the known international redial service, *234 as described by the 'xxx patent application.

Moreover, announcements or services provided for international redial services can be coordinated with other announcements and services such as those taught by the '809 patent referenced above.

The method of placing an international call may be implemented at a network adjunct call processor associated with any switching office utilized in establishing an international call and preferably associated with an international gateway switching center. The network adjunct processor comprises interactive voice systems for making announcements/prompts such as: "Please hold while we try your call again" and alternative or other prompts/announcements as believed necessary. Also, a database management system of the adjunct stores the initially dialed digits of the called party's international number for redialing. These elements of the adjunct are coupled together and with the toll network by data transport facilities. Moreover, the apparatus for accomplishing the present method may be implemented within the software and hardware of the international gateway switch itself, for example, a #4ESS electronic switching system available from Lucent Technologies, Inc.

These and other features of the present invention will be explained with reference to the drawings.

DETAILED DESCRIPTION

Figure 1:
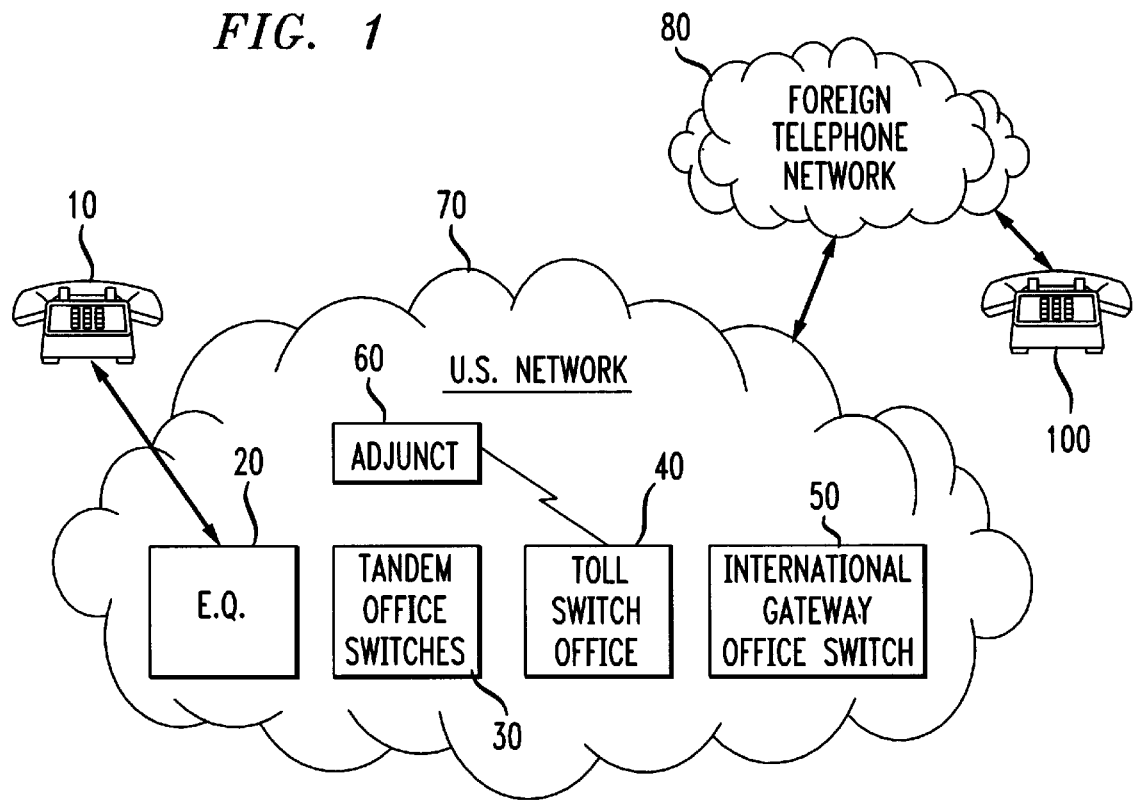
FIG. 1 represents a schematic drawing of a typical telephone network comprising domestic network 70 and foreign network 80 useful for explaining an international call completion according to the present invention, the domestic network 70 including an international gateway switching center 50 and an associated network adjunct processor 60 in accordance with one embodiment of the present invention.

Referring to FIG. 1 there is shown a typical world-wide telephone network comprising a domestic switched telephone network 70 and a foreign telephone network 80. Of course, domestic switched telephone network 70 may connect to multiple foreign telephone networks 80, only one of which is shown, for each country in the world. The International Telecommunications Union (sometimes referred to as the ITU or the UIT, formerly the CCITT) of the United Nations assists the various countries of the world in agreeing to uniform standards for international call processing. In the United States, a caller at station 10 dials 0-1-1 in order to signal an end office 20 in his local exchange area that he wishes to place an international call. The immediately following series of digits represent a country code and a city or region code. These digits are followed by the telephone number of the called party that the caller wishes to reach.

Traditionally, once the end office 20 receives the digits 0-1-1, the end office 20 knows that it is to forward the following digits to a toll switch 40 (sometimes via a tandem switch 30) which in turn forwards the dialed digits to an international gateway switching office 50 (a long distance switching office is sometimes known as a toll center) that can connect to a selected foreign telephone network 80 represented by the following country code digits. The end office 20, for example, may signal the international gateway toll center 50 via either an inband or a more modern out-of-band signaling system. The end office 20 may forward the dialed digits and automatic number identification (ANI) data identifying the calling party 10 by their telephone number.

When the international gateway switching office 50, for example, a #4ESS switch available from Lucent Technologies, Inc., receives the country code, city/region code and telephone number, international gateway switching office 50 is in a position to look both ways to establish links to the caller 10 via other network elements, if not already established, and the called party 100. In prior art in-band signaling, the communication links through tandem switching offices 30 and toll switching offices 40 are determined at the time of signaling international gateway switching office 50. That is, the end office 20 attempts to reach international gateway switching office 50 by establishing successive communication links through; for example, tandem office 30, toll office 40 and finally to international gateway switching office 50. In more modern out-of-band signaling systems, such as SS-7, the communication links are determined after signaling. In either event, the talking path between caller 10 and the international gateway switching office 50 are typically determined at the time or before the international gateway switching office 50 begins to reach the foreign network 80. The international gateway switching office 50 then signals the foreign telephone network 80 by forwarding the dialed city/region code and telephone number of the called party.

The present invention, as will be further described in detail in connection with a discussion of FIG. 3, relates to what happens next in the event of a failure in establishing communication links between the domestic caller 10 and the foreign called party 100. The failure may arise either in the domestic network 70 or in the international network 80. According to the prior art, the domestic network 70 has an associated timer or counter for timing the length of time until answer. The timer may be associated with any switching office in the domestic network. If this timer expires, which has a predetermined interval, for example, five to ten seconds, the caller receives a return message: "All circuits are busy now; please try your call again later." If the subscriber/caller has subscribed to AIR service, a network adjunct 60 alternatively offers the caller 10 an opportunity to dial *234 for international redial service and the foreign called party's number will be automatically redialed, for example, up to ten times over a half hour period. According to the present invention as will be explained in greater detail herein, and prior to offering *234 AIR service, the caller may be advised that they should stay on the line and the network adjunct 60 will immediately and automatically reattempt the call, for example, twice.

According to an alternative embodiment of the present invention and as taught by the 'xxx patent application for AIR services, it is useful to employ unsuccessful call reason information returned by the foreign network 80 to the domestic network 70 to trigger an automatic reattempt of the called telephone number, in place of or simultaneously with the time-out. For example, and utilizing the ISUP signaling system by way of example, if the returned cause value code is 17 for user busy or 42 for switching equipment congestion, an automatic reattempt may be offered prior to offering AIR services. There may be many additional returned unsuccessful call reasons that may suggest a similar offer of automatic reattempt and redial services.

Also, according to the present invention, if congestion in domestic network 70 causes the failure of the international call, network adjunct 60 will immediately attempt to establish communication links to end office 20 serving the calling party, hoping the domestic network congestion is removed. For example, if the calling party 10 is a subscriber to AIR service, then, adjunct 60 may offer automatic reattempt service to the calling party 10 in the event of either domestic network congestion or foreign network congestion, among other possible unsuccessful call reasons.

Also, according to the present invention and again using an indicative signal code by way of example, if the cause value code 28 for invalid number format is returned by foreign telephone network 80, the automatic reattempt feature may be inhibited. Inhibiting the redialing of an invalid number is clearly beneficial and saves the customer and the network time and resources.

Figure 2:
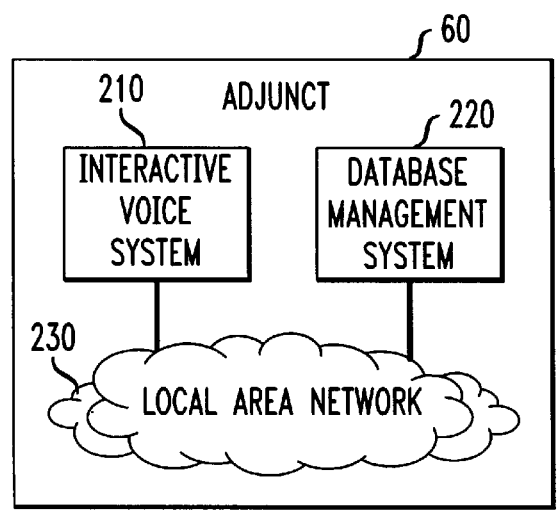
FIG. 2 represents a functional block diagram of a network adjunct processor 60 introduced in FIG. 1.

Referring to FIG. 2, system functions related to international automatic reattempt and redial services are, in one embodiment, performed by a network adjunct processor 60 associated with domestic network 70. As such, adjunct 60 may be a shared resource of toll switches 40 dispersed in domestic network 70. Although network adjunct 60 is illustrated as comprising part of the domestic network 70, the features of adjunct 60 may be provided by stand-alone equipment if desired. Alternatively, the functions described as associated with adjunct 60 may be similarly provided at any alternative office in the domestic network 70 including end office 20, tandem office 30, toll office 40, international gateway switching office 50 or an office of the foreign network 80.

Adjunct 60 comprises an interactive voice system 210 that may or may not be conversant, as it may simply provide announcements responsive to a network condition or call processing event, or it may prompt the user or caller for further input and thus be conversant. Interactive voice systems are known, for example, from Lucent Technologies Inc. or Nortel. The caller or called party may respond by utilizing their touchtone keypads or, with speech recognition circuits included in the interactive voice system 210, the caller may speak a response to a prompt that may be interpreted by the interactive voice system 210. If touchtone signaling is used, the interactive voice system 210 may comprise dual tone multifrequency receivers for receiving the touchtone signals initiated by the caller in response to a prompt. Database management system 220 processes and maintains timers, subscriber records, call status tables, called party dialed address digit data, country/language/time of day tables and the like among other data. A local area network 230 supports data communications between elements of the adjunct 60.

Now referring to FIGS. 1 and 3, the call processing method for providing international automatic reattempt (and redial) services will be explained in greater detail. From network studies, it has been learned that the likelihood of success of an international call on immediate reattempt is reasonably great. Consequently, according to the present invention, and before the caller is encouraged to hang up or before alternative international redial services are offered, the caller is advised that they should hold on the line and the network will automatically try their call again. This service is represented by boxes 340 to 365 in sequence of the drawing, FIG. 3, as will be further described below. By convention, numbers appearing in circles, for example, associated with decision boxes 335, 340, 355 and 365 represent signals to go to a similarly marked box appearing later in the flowchart of FIG. 3, for example, boxes 340 and 370.

According to box 305 and referring to FIG. 1, a domestic toll network 70 receives data representing the calling party's telephone number and the dialed digits of the called party 100 either via an in-band or out-of-band signaling system. In-band (older) systems require the establishment of successive communication links from end office 20, perhaps, through tandem and toll offices 30, 40 to the international gateway switch 50. In newer out-of-band systems, the international gateway switching office 50 receives the signaling data via a data communications channel, for example, via an SS-7 system, before the communication, talking links are established.

According to box 310, domestic toll switch 40 of domestic network 70 arranges to identify the calling party through ANI data forwarded by the domestic end office 20 serving the calling party. Caller tables for various services offered are provided. Through look-up of the caller's ANI data, these may identify whether the caller has subscribed to international redial services, for example, AT&T International Redial service. The table can identify through look-up of the ANI what language the subscriber, if any, has selected for prompts/announcements to a called party 100. Further information regarding country and language based selection can be found in co-pending U.S. patent application Ser. No., filed (Hau '000). If the caller has subscribed to international redial service, the call processing function is forwarded to adjunct 60, indicated by box 315 labeled "Route call to Adjunct." The adjunct 60 then may continue call processing of an international redial service subscriber. If the caller has not subscribed to international redial service, the domestic toll network 70 continues call processing the call towards international gateway switching center 50 and foreign network 80 to called party 100 in a normal manner which may not offer automatic reattempt, according to the present invention, or international redial service.

Box 320 labeled "Validate customer and country data" involves the processes of performing initial call processing involving database management system 220. By validate customer is meant the validation of the calling party 10, for example, by ANI to determine if they are susceptible to fraud control or other security measures. The tasks associated with box 320 may include a look-up of other services subscribed to and country/language selections. They may also include call blocking, for example, if the caller has not paid their bill or has otherwise an unfavorable record with the toll carrier. Other database management services, relevant to the present invention, are also performed at this box 320.

According to the '809 patent referenced above, while the caller is waiting for the call to go through and upon receipt of the dialed international digits, country and region/city based announcements may be provided to the caller such as the time in the country/region dialed or the weather or the like.

Once the adjunct 60 has decided to proceed with the call, an international priority routing flag is set at box 325 to request a priority routing privilege at the international gateway switching office 50. At step 330, labeled "Perform international call set-up process," an attempt is made to complete the international call. In in band signaling systems, this means establishing communication links between calling party 10 and international gateway switching office 50. In out-of-band systems, the communication links to switching office 50 may be already presumed to be established. In either case, the international gateway toll center 50 now attempts to signal the foreign network 80 and forwards the necessary dialed digits for completing the call to called party 100. Adjunct 60 immediately starts a call processing timer in accordance with the prior art. The timer counts until a call is completed and ringing signal is returned or unsuccessful call reason information is returned from foreign telephone network 80, indicating a call completion failure in the direction of called party 100 or a domestic network congestion indication is received in attempting to establish the communication links between serving end office 20 and international gateway toll center 50.

According to box 335, labeled "Call complete?," the international call to called party 100 is either successful or it is not. Of course, if at any time, the caller hangs up, call processing ceases. This is not shown in the flow chart. If the call is successfully completed to the called party 100, represented by "Y" for Yes, then call processing is done at step 335 and the present invention represented by steps 340 to 365 is not even reached.

A call failure represented by "N" for No may result from the time-out of a timer, for example, for timing the international call completion interval or by the receipt of unsuccessful call reason information, for example, whichever occurs first. Unsuccessful call reason information may regulate the duration of the timer according to the present invention over time. In accordance with the present invention, a country/region or city table may be maintained in adjunct memory and periodically updated for an international call. The table may be indexed according to unsuccessful call reason. In the table under country/city or region and unsuccessful call reason may be a call pattern historical average maintained. For example, network congestion for Paris, France may represent a typical time-out of x seconds. For Mexico City, Mexico, the time-out period may be different. Also, over time, as foreign networks improve in quality, the time-out may be updated to a presumably more efficient time-out period that becomes shorter and shorter.

In any event, the present invention of boxes 345 and 350 may be triggered by a time-out which may be predetermined or variable and "learned" over time.

Figure 3:
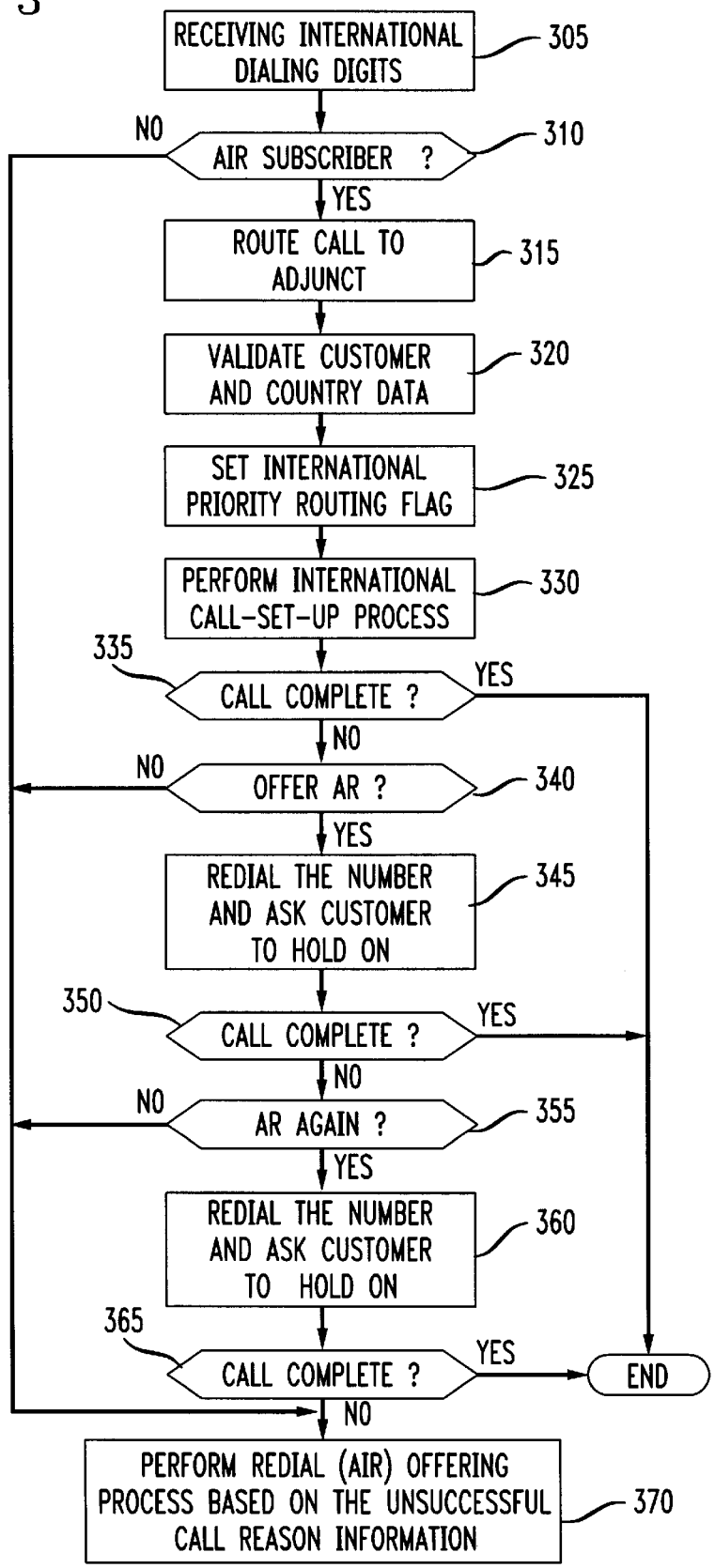
FIG. 3 represents a call processing flowchart for describing call processing activities of adjunct 60 according to one embodiment of the present invention.

In an alternative embodiment, the embodiment described by FIG. 3, at box 340, labeled "Offer automatic reattempt (AR)?," when the call fails to complete, the adjunct 60 analyzes a system automatic reattempt AR flag and a course of action determined. If the system flag (an automatic reattempt AR flag) is set to "on" for the foreign country the caller has dialed, the network adjunct will immediatelly initiate and automatic reattempt upon the failure of the interantional call.

For example, if a foreign network 80 returns an indicative signal code (unsuccessful call reason information) with a value of 17 representing user busy or a value 42 for network congestion or there is an indication that the domestic network 70 cannot establish domestic communication links, then, the caller at box 340 receives a suggestion from the network adjunct 60 that they stay on the line and the call will be automatically reattempted at box 345 labeled "Redial the # and ask the customer to hold on." There are probably other unsuccessful call reasons that may come to mind besides user busy and domestic or foreign network congestion that can utilize automatic international reattempt according to the present invention to advantage.

On the other hand, at step 340, there exist other unsuccessful call reasons that may come to mind when it may be appropriate to not offer automatic reattempt service according to the present invention and to proceed immediately to consider an offer of international redial services, box 370. This is represented by the number 2 in a circle pointing to step 370, discussed in greater detail herein.

At step 345, the call is automatically reattempted to called party 100. At box 350, labeled "Call complete?," the adjunct 60 determines whether the automatic reattempt is successful. Of course, if the call is successful, the customer is happy. Only one local exchange carrier access charge is recorded. The toll carrier will receive its revenue for the call.

If the call is not successful, step 355, labeled "Offer AR again?"is entered. Again, the adjunct 60 checks a system AR flag at step 350 for determining whether to make the AR offer. If the flag is set to "on," then the adjunct 60 will make another "automatic reattempt" to complete the call. The number 3 in a circle represents a movement in the call processing to step 370 where an offer of international redial services is considered.

At box 360, the call is reattempted for the second time and the same or a similar announcement is provided to the calling party 10 that they should stay on the line while the call is reattempted. (The number of automatic reattempts in this exemplary embodiment is two but may be predetermined to a different number as a system parameter). Again, if the call is completed, the caller 10 is happy. On the other hand, after two automatic reattempts and failures resulting both times, step 370 is entered which is labeled "Perform redial (AIR offering process based on the unsuccessful call reason information" returned from previous call attempts or the time-out of a timer. What is perhaps appropriate and is suggested by box 370 is that caller 10 be provided the opportunity to receive international redial service, for example, AT&T International Redial service by entering *234, which offers to automatically redial the called party 100 up to ten times in a half hour period. Of course, if the caller 10 accepts, adjunct 60 begins to perform this service and the caller 10 may hang up. When the adjunct 60 successfully reaches the called international party, the adjunct 60 rings the calling party 10, the international call proceeds and the calling party is billed for the call.

The foregoing is merely illustrative of the principles of the invention and various modifications can be made and come to mind to those of ordinary skill in the art from studying the present specification and without departing from the scope and spirit of the invention. For example, different informative messages and types of international redial services may be provided by adjunct 60 in response to different network conditions. Different hardware may be used than shown and suggested which may comprise hardware, firmware or software implementations of the present method. Any United States patents or patent applications cited herein should be deemed to be incorporated by reference as to their entire contents. The invention should only be deemed to be limited in scope by the claims which follow.

What we claim is:

1. A method of completing an international call to a called foreign country comprising the steps of:
    determining at a network adjunct processor if the international call cannot be completed as dialed by timing an interval between from the event of one of the receipt of called foreign country identification data or a later event and receiving an indication of one of call failure or call completion and by comparing the time interval with a stored value associated with said called foreign country identification data; and
    automatically reattempting the call if the call is not completed as dialed.

2. A method of completing an international call as recited in claim 1 wherein said stored value is updated to a new stored value as calls are placed to the called foreign country.

3. A method of completing an international call as recited in claim 1 wherein said stored value associated with the called foreign country is further associated with data representative of a particular call failure.

4. A method of completing an international call as recited in claim 1 wherein said determination step comprises the step of analyzing received unsuccessful call reason information.

5. A method of completing an international call as recited in claim 4 wherein said unsuccessful call reason information comprises unsuccessful call reason information returned from a foreign network.

6. A method of completing an international call as recited in claim 5 wherein said unsuccessful call reason information comprises information indicating one of foreign station busy or foreign network congestion.

7. A method of completing an international call as recited in claim 4 wherein said unsuccessful call reason information comprises unsuccessful call reason information returned from a domestic network.

8. A method of completing an international call as recited in claim 4 wherein, if said unsuccessful call reason information comprises information indicating an invalid number, then said step of automatically reattempting call completion is inhibited.

9. A method of completing an international call as recited in claim 4 wherein said automatic reattempt step is performed twice depending on an analysis of unsuccessful call reason information.

10. A method of completing an international call as recited in claim 1 wherein said automatic call reattempt comprises the steps of
    announcing to the caller the status of the call and reattempting to establish communication links between the caller and the called party.

11. A method of completing an international call as recited in claim 1 further comprising the step of
    providing country/region based announcements associated with the dialed international call.

12. A method of completing an international call as recited in claim 1 further comprising the step of
    announcing alternative international redial service if the automatic reattempt fails.

13. A method of completing an international call as recited in claim 1 further comprising the step of
    storing a dialed international number for redialing.

14. A method as recited in claim 1 further comprising the step of checking if an international caller is a subscriber to a network international reattempt service.

15. A method as recited in claim 1 wherein said event is the beginning of signaling said called foreign country.

16. A method as recited in claim 1 further comprising the step of storing a table in memory by country and one of city or region of typical time interval.

17. Network adjunct apparatus for completing an international call to a called foreign country comprising:
    a processor for determining if the international call cannot be completed as dialed,
    a timer for timing an interval between the event of one of the receipt of called foreign country identification data or a later event and receiving an indication of one of call failure or call completion,
    a memory for storing a stored value associated with said called foreign country identification data, said processor for comparing the time interval with a stored value associated with said called foreign country identification data; and
    a signaling circuit for automatically reattempting the call if the call is not completed as dialed.

18. Apparatus for completing an international call as recited in claim 17 wherein said stored value is updated to a new stored value as calls are placed to the called foreign country.

19. Apparatus for completing an international call as recited in claim 17 wherein said stored value associated with the called foreign country is further associated with data representative of a particular unsuccessful call reason.

20. Apparatus for completing an international call as recited in claim 17 wherein said processor further analyzes received unsuccessful call reason information.

21. Apparatus for completing an international call as recited in claim 20 wherein said unsuccessful call reason information comprises unsuccessful call reason information returned from a foreign network.

22. Apparatus for completing an international call as recited in claim 21 wherein, if said foreign unsuccessful call reason information comprises information indicating an invalid number, then the processor inhibits said signaling circuit from automatically reattempting the call.

23. Apparatus for completing an international call as recited in claim 21 wherein said foreign unsuccessful call reason information comprises information indicating one of foreign station busy or foreign network congestion.

24. Apparatus for completing an international call as recited in claim 20 wherein said unsuccessful call reason information comprises unsuccessful call reason information returned from a domestic network.

25. Apparatus for completing an international call as recited in claim 17 further comprising
    announcement circuits for announcing to the caller the status of the call and the reattempt to establish communication links between the caller and the called party.

26. Apparatus for completing an international call as recited in claim 17 further comprising
    announcement circuits for providing country/region based announcements associated with the dialed international call.

27. Apparatus for completing an international call as recited in claim 17 further comprising
    an announcement circuit for announcing alternative international redial service if the automatic reattempt fails.

28. Apparatus for completing an international call as recited in claim 17 further comprising
    a memory for storing a dialed international number for redialing.

29. Apparatus as recited in claim 17 wherein said processor further checks whether an international caller is a subscriber to a network international reattempt service.

30. Apparatus as recited in claim 17 wherein said event is the beginning of signaling said called foreign country.

31. Apparatus as recited in claim 17 wherein said foreign country identification data comprises country and one of city or region.

* * * * *